(12) United States Patent
Nolan (10) Patent No.: US 6,375,437 B1
(45) Date of Patent: Apr. 23, 2002

(54) POWER OPERATED AIR COMPRESSOR ASSEMBLY

(75) Inventor: Patrick B. Nolan, Shelton, CT (US)

(73) Assignee: Stanley Fastening Systems, LP, East Greenwich, RI (US)

( * ) Notice: Subject to any disclaimer, the term of this patent is extended or adjusted under 35 U.S.C. 154(b) by 0 days.

(21) Appl. No.: 09/593,464

(22) Filed: Jun. 14, 2000

Related U.S. Application Data (60) Provisional application No. 60/180,221, filed on Feb. 4, 2000.

(51) Int. Cl.[7] .................................................. F04B 53/00
(52) U.S. Cl. ........................................ 417/234; 137/248
(58) Field of Search ............................... 137/248, 899.4, 137/565.18; 248/637; D15/7.9; 417/234

(56) References Cited

U.S. PATENT DOCUMENTS

| 1,186,157 A | | 6/1916 | Abell ........................ 174/178 |
| D170,330 S | | 9/1953 | Miller ........................ 248/639 |
| 2,812,895 A | * | 11/1957 | Peeps ........................ 417/234 |
| 3,695,786 A | | 10/1972 | Gannaway ..................... 184/6 |
| 3,815,965 A | | 6/1974 | Ostwald ...................... 181/204 |
| 4,077,747 A | * | 3/1978 | Burenga ...................... 417/234 |
| 4,086,040 A | | 4/1978 | Shibuya et al. .............. 418/100 |
| 4,432,470 A | * | 2/1984 | Sopha ........................ 222/135 |
| 4,662,551 A | | 5/1987 | Dudley et al. ............... 224/262 |
| D293,682 S | | 1/1988 | Liou .......................... D15/9 |
| 4,989,323 A | | 2/1991 | Casper et al. ................. 30/276 |
| D328,465 S | | 8/1992 | Schwarz et al. ............... D15/7 |
| D352,292 S | | 11/1994 | Morgan ........................ D15/7 |
| D352,293 S | | 11/1994 | Morgan ........................ D15/7 |
| 5,449,277 A | | 9/1995 | Hood .......................... 417/540 |
| D377,799 S | | 2/1997 | Kruzel et al. ................. D15/7 |
| D384,676 S | | 10/1997 | Cyphers et al. ................ D15/7 |
| 5,697,249 A | | 12/1997 | Miguchi ...................... 192/115 |
| 5,907,970 A | | 6/1999 | Havlovick et al. ............. 403/13 |
| D440,578 S | * | 4/2001 | Nolan ......................... D15/9 |

* cited by examiner

Primary Examiner—Charles G. Freay
Assistant Examiner—Han L Liu
(74) Attorney, Agent, or Firm—Pillsbury Winthrop LLP (57) ABSTRACT

A portable power operated air compressor assembly comprises a portable frame structure and a power operated air compressor unit. The power operated air compressor unit is carried by the frame structure. The frame structure has structure constructed and arranged to provide a source of air under pressure when power operated. A containing structure is carried by the frame structure and is constructed and arranged to receive and contain the source of air under pressure provided by the power operated air compressor unit for use when desired.

The portable frame structure includes a base portion providing ground engaging surfaces configured and positioned to engage and support the base portion in generally horizontally extending relation on a horizontal surface. An upright portion has a juncture with the base portion and extends upwardly therefrom when the base portion is supported as aforesaid. A handle is positioned above the base portion when the base portion is supported as aforesaid and configured to be manually grasped. A skid plate forms a part of the base portion and the upright portion at the juncture therebetween. The skid plate provides runner-like surfaces at the juncture between the base portion and the upright portion. The skid plate is configured and positioned to slidingly support the frame structure along a horizontal surface in response to a manual movement imparted thereto by a user grasping the handle and moving the portable frame structure so as to transfer the horizontal surface engagement from the ground engaging surfaces to the runner-like surfaces.

17 Claims, 5 Drawing Sheets

POWER OPERATED AIR COMPRESSOR ASSEMBLY

This application claims the benefit of U.S. Provisional Application No. 60/180,221, filed Feb. 4, 2000.

This invention relates to power operated air compressor assemblies and more particularly to power operated air compressor assemblies of the portable type suitable for use in operating pneumatically actuated fastener driving tools.

Power operated air compressor assemblies of the type herein contemplated are well known in the art. Typically, the assemblies comprise a frame structure carrying a power operated air compressor unit operated to provide a source of air under pressure and a pressure container configured to contain the source of air under pressure provided by the power operated air compressor unit.

Typically, the power operated air compressor unit is an off the shelf item comprising a conventional air compressor of any known construction, as, for example, a reciprocating piston type compressor having a suitable prime mover drivingly connected thereto as, for example, an electric motor or an internal combustion engine. Similarly, the container is an off the shelf item, typically one or two cylindrical tanks.

The off the shelf items utilized also include various control valves, air tubes and air pressure gauges. Generally, it can be stated that the frame structure is the only customized component provided in most commercially available power operated air compressor assemblies. Accordingly, there is a need to provide the frame structure with desirable functional features and/or a construction which is cost effective.

An object of the present invention is the provision of a power operated air compressor assembly capable of meeting the above noted needs. In accordance with the principles of the present invention, this objective is met by providing a power operated air compressor assembly having generally the off the shelf components mentioned above and a frame structure which has any one or any combination of two or more of the following features. First, the portable frame structure includes a base portion providing ground engaging surfaces configured and positioned to engage and support the base portion in generally horizontally extending relation on a horizontal surface, an upright portion having a juncture with the base portion and extending upwardly therefrom when the base portion is supported as aforesaid, and a handle positioned above the base portion when the base portion is supported as aforesaid and configured to be manually grasped. A skid plate forms a part of the base portion and the upright portion at the juncture therebetween which is either a skid plate providing runner-like surfaces at the juncture between the base portion and the upright portion configured and positioned to slidingly support the frame structure along a horizontal surface in response to a manual movement imparted thereto by a user grasping the handle and moving the portable frame structure so as to transfer the horizontal surface engagement from the ground engaging surfaces to the runner-like surfaces and/or a protective plate disposed in spaced protecting relation to a drain valve on a cylindrical tank included in the containing structure at a position alongside the protective plate. The protective plate has an opening providing manual access to the drain valve.

Second, the portable frame structure provides a lower handle positioned in horizontally outwardly spaced relation with respect to the power operated air compressor unit and configured to be manually grasped by a user, and an upper handle which is positioned in vertically upwardly spaced relation with respect to the power operated air compressor unit configured to be manually grasped by a user. The lower and upper handles are constructed and arranged to enable the frame structure to be lifted by a single person gripping each handle with a different hand or by two persons each gripping a different handle with one hand.

Third, the portable frame structure includes a base portion providing ground engaging surfaces configured and positioned to engage and support the base portion in generally horizontally extending relation on a horizontal surface, an upright portion having a juncture with the base portion and extending upwardly therefrom when the base portion is supported as aforesaid, and an inclined portion extending upwardly and inwardly from the upright portion providing a handle positioned above the power operated air compressor unit and configured to be manually grasped. The inclined portion includes an inclined protective plate having a series of openings therein positioned in convenient user access. A air pressure gauge containing structure having structure constructed and arranged to display the pressure of the air under pressure within the containing structure is cooperatively mounted with respect to a first opening of the series of openings. An air under pressure outlet, communicating with the containing structure, is cooperatively mounted with respect to a second opening of the series of openings. A manually operable valve is cooperatively mounted with respect to a third opening of the series of openings. The manually operable valve is constructed and arranged to vary the air pressure provided by the containing structure which is communicated to the outlet for use when desired. An output air pressure gauge having structure constructed and arranged to display the pressure of the air under pressure at the outlet cooperatively mounted with respect to a fourth opening of the series of openings. A manually actuated control member is cooperatively mounted with respect to a fifth opening of the series of openings. The control member has a structure constructed and arranged to control the operation of the power operated compressor unit.

Fourth, the portable frame structure includes a base portion providing ground engaging surfaces configured and positioned to engage and support the base portion in generally horizontally extending relation on a horizontal surface, an upright portion having a juncture with the base portion and extending upwardly therefrom when the base portion is supported as aforesaid, and an inclined portion extending upwardly and inwardly from the upright portion providing a handle positioned above the power operated air compressor unit, said inclined portion and configured to be manually grasped.

The inclined portion includes an inclined protective plate having an opening positioned in convenient user access. Air pressure gauge structure is carried by the protective plate in a position to be received by a user looking down thereon, and gauge protective structure is fixedly carried by the protective plate configured and positioned to provide spaced peripheral damage protection for the gauge structure.

DETAILED DESCRIPTION OF THE PREFERRED EMBODIMENT OF THE INVENTION

Figure 1:
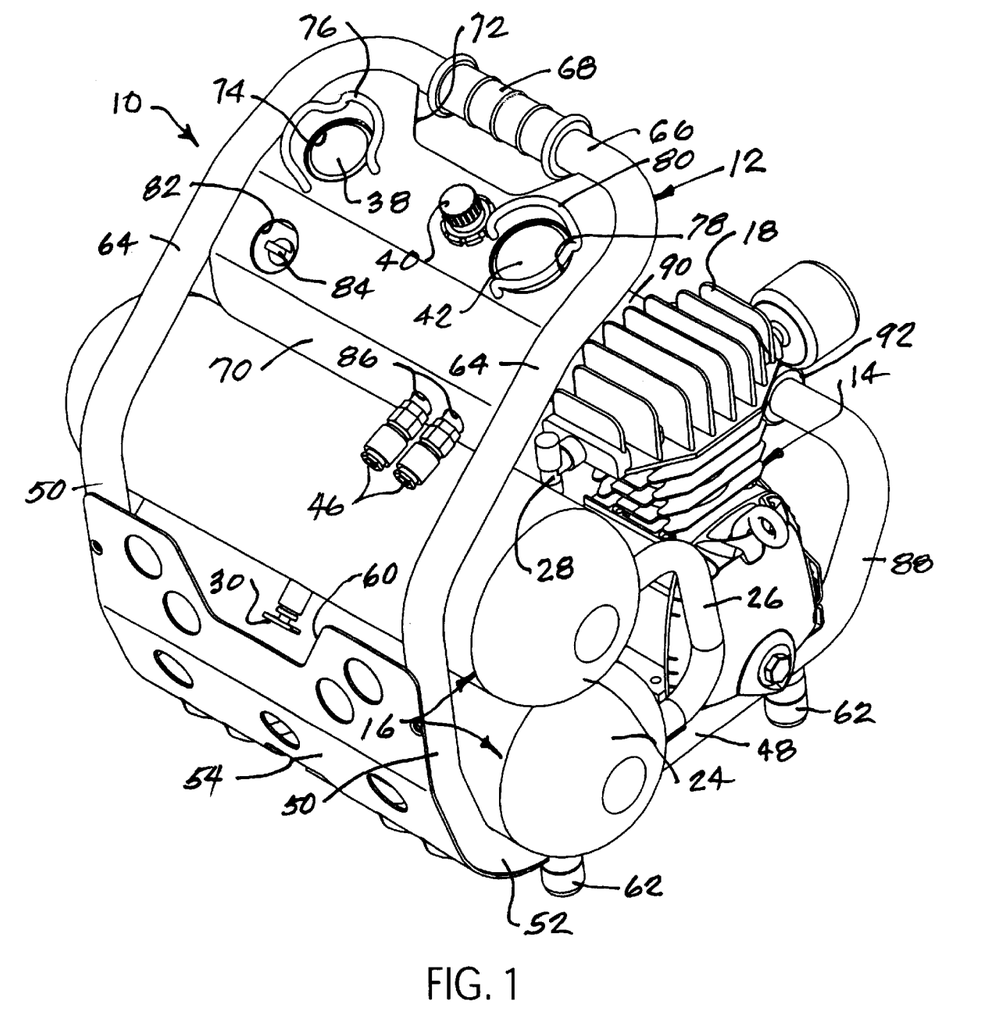
FIG. 1 a perspective view of a power operated air compressor assembly embodying the principles of the present invention.
Figure 2:
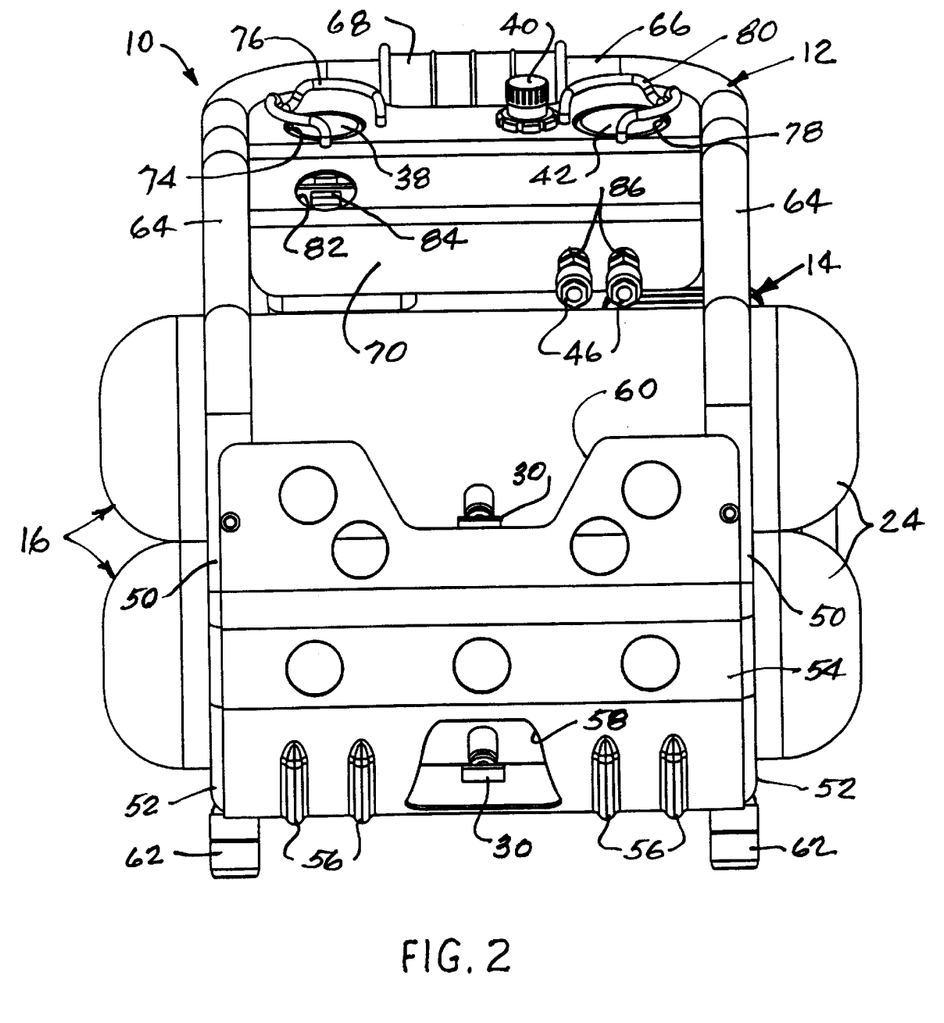
FIG. 2 is a front elevational view of the assembly shown in FIG. 1.

Referring now more particularly to the drawings, there is shown in FIGS. 1 and 2 thereof a power operated air compressor assembly, generally indicated at 10 which embodies the principles of the present invention. In general, the power operated air compressor assembly 10 includes a frame structure, generally indicated at 12, which carries a power operated air compressor unit, generally indicated at 14, and an air pressure containing structure, generally indicated at 16. The power operated air compressor unit 14 is comprised of conventional components. In the example best shown in FIG. 3, the power operated compressor unit 14 includes a compressor 18 which is of the single piston type driven by an electric motor 20 which, in turn, drives a fan cooling system 22 for the electric motor 20 and the compressor 18.

When the compressor 18 is power operated by the electric motor 20, it is operable to provide a source of air under pressure to the containing structure 16. As shown, the containing structure 16 is in the form of a pair of cylindrical tanks 24 fixedly mounted on the frame structure 12 in vertical parallel relation. The tanks 24 are intercommunicated as by a pipe 26 and have an inlet which receive the source of air under pressure produced by the compressor through a line 28 (FIG. 7). Each tank 24 includes a manually operable drain valve 30 communicating with the lower interior portion thereof.

Figure 3:
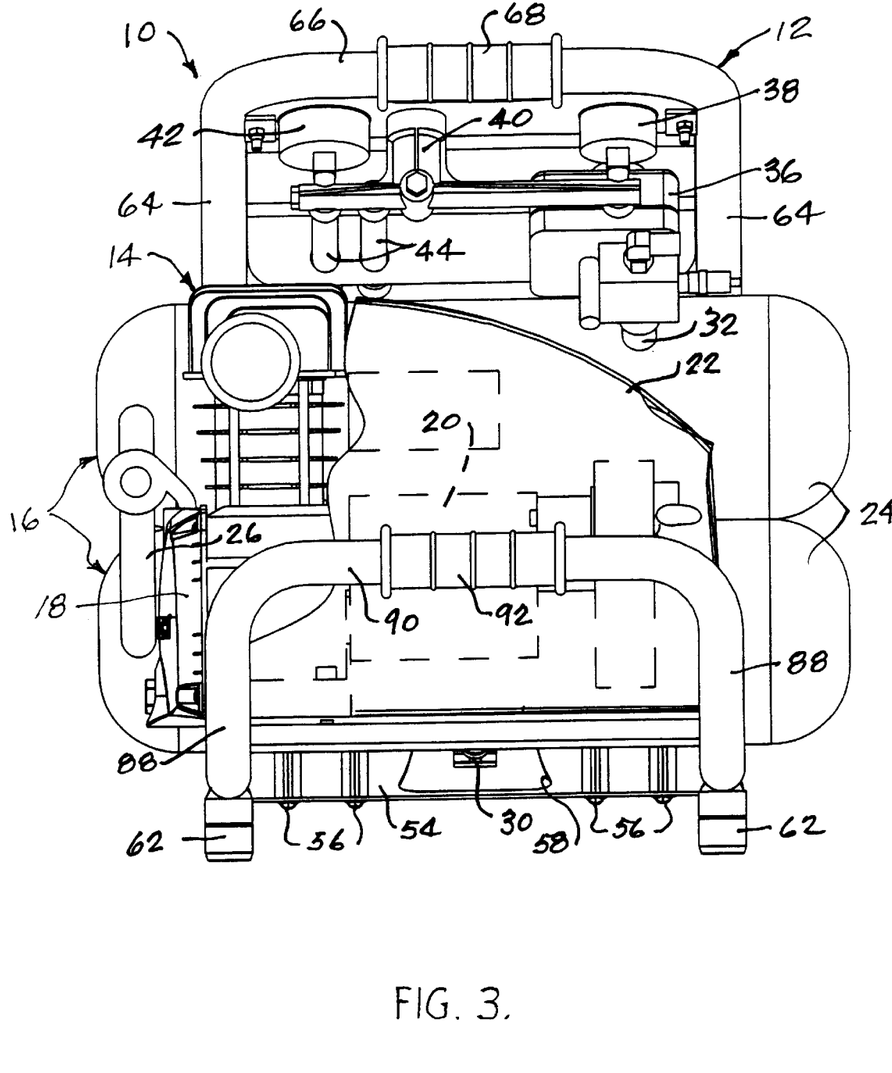
FIG. 3 is a rear elevational view of the assembly shown in FIG. 1.
Figure 4:
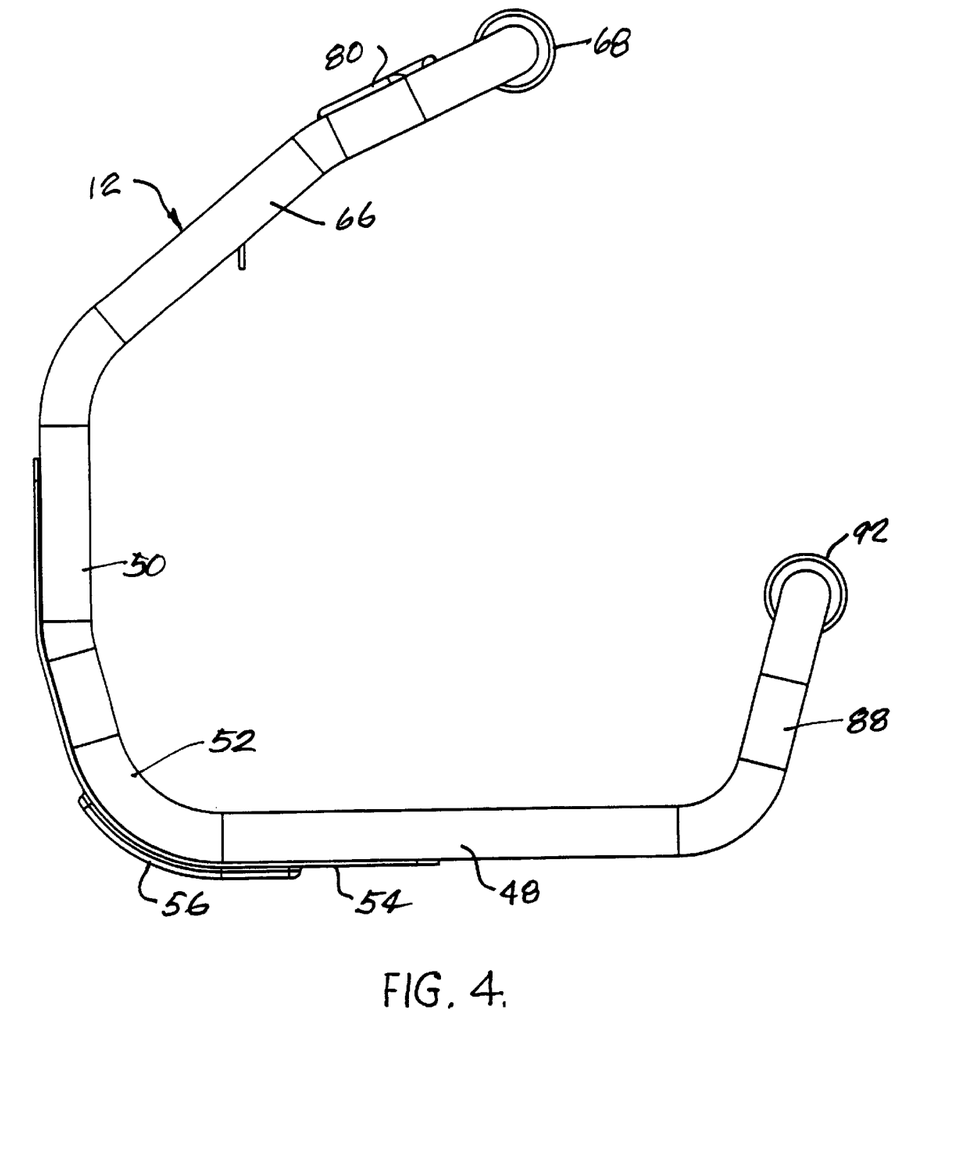
FIG. 4 is a side elevational view of the frame structure embodied in the assembly shown in FIGS. 1–3, with the lower legs removed.
Figure 5:
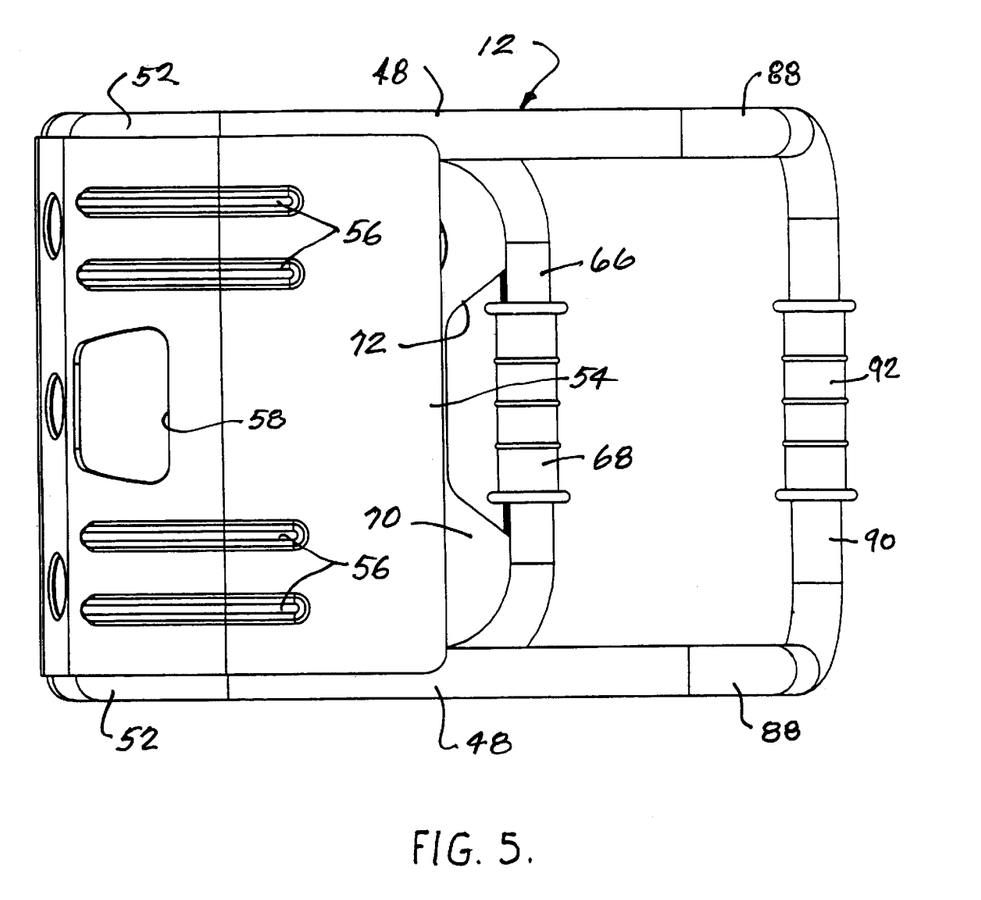
FIG. 5 is a bottom plan view of the frame structure shown in FIG. 4.

An outlet line 32 leads from the tanks 24 lead to a pressure gauge unit 34 which, in turn, leads to a manifold 36. The manifold 36 leads to a tank pressure gauge unit 38 and to a manually adjustable outlet pressure valve unit 40. As best shown in FIG. 3, the adjustable outlet pressure valve unit 40 leads to an outlet pressure gauge unit 42 and to a pair of outlet lines 44 terminating in couplings 46. Each coupling 46 is constructed and arranged to interengage with a cooperating coupling on an air line operating a pneumatic device as, for example, a pneumatically operated fastener driving device.

The entire assembly 10, including the frame structure 12, is portable and, as shown, the frame structure 12 utilizes as a main component thereof tubular stock. As shown, the tubular stock component of the frame structure 12 includes a pair of transversely spaced tubular base frame members 48 having a pair of transversely spaced tubular upright frame members 50 forming upright integral extensions thereof at one pair of ends thereof. The pair of tubular base frame members 48 have junctures 52 with the upright frame members 50 which are arcuate and a skid plate 54 is fixedly attached to the underside of the pair of tubular base frame members 48 and the tubular upright frame members 50 in the area of the junctures 52.

As best shown in FIGS. 1–3 and 5, the skid plate 54 includes a series of parallel embossments 56 which provide runner-like surfaces at the junctures 52. The skid plate 54 serves as a protection plate for the tanks 24 and the drain valves 30 thereof. The central portion of the plate 54 has an opening 58 therein to provide for manual access to the drain valve 30 of the lower tank 24 and a recess 60 in the upper marginal edge thereof to provide for manual access to the drain valve 30 of the upper tank 24.

The base plate frame members 48 and the contiguous portion of the skid plate 54 constitute a base portion of the frame structure 12 which also includes four spaced legs 62 suitably welded to the underside of the base frame members 48. The legs 62 provide downwardly facing ground engaging surfaces for supporting the assembly 10 in a normal operating position on a horizontal surface.

The tubular component of the frame structure 12 also includes an upper U-shaped tubular frame member which includes a pair of transversely spaced tubular leg portions 64 forming upwardly and inwardly extending integral extensions of the upper ends of the upright tubular frame members 50. The leg portions 64 are integrally interconnected at their outer ends with a bight portion 66 which extends transversely therebetween at a position spaced above the power operated air compressor unit 14 so as to define an upper handle. As shown, a handle grip 68 is mounted on the center of the bight portion 66.

The upper U-shaped member 64–66 defines an upper inclined portion of the frame structure 12 which also includes a protective plate 70 fixed as by welding or the like across the leg portions 64. The protective plate 70 includes a recess 72 adjacent the handle grip 68 and a series of functional openings which includes an opening 74 with respect to which the dial face of the tank pressure gauge unit 38 is cooperatively mounted to provide the user with convenient visual access. Fixed to the plate 70 in an outwardly spaced peripherally encirculating relation to the opening 74 is a rigid arcuate rod 76 which provides damage protection for the dial face of the tank pressure gauge unit 38.

A similar opening 78 is formed in the plate 70 with respect to which the dial face of the output pressure gauge unit 42 is cooperatively mounted.

As before, an rigid arcuate rod 80 is fixed to the plate to similarly protect the deal face of the output pressure gauge unit 42.

The plate 70 also includes an opening (hidden in the drawings) between the openings 74 and 78 within which the manually adjustable output air pressure valve unit 40 is cooperatively mounted so that the adjusting knob hereof is presented for convenient access to the user.

The plate 70 also includes an opening 82 with respect to which manually operable control member 84 and an on-off control switch is cooperatively mounted. Finally, the plate also includes a pair of openings 86 through which the couplings 46 are cooperatively mounted. It can thus be seen that the protective plate 70 not only serves to mount and protect the visual and manually operable elements which the user must interface with in the operation of the assembly 10 but maintains them in a convenient focused area of access.

The tubular component of the frame structure 12 also includes a lower U-shaped tubular member which includes a pair of transversely spaced leg portions 88 forming upwardly and outwardly extending integral extensions of an opposite pair of ends of the pair of tubular base frame members 48. The outer ends of the leg portions are integrally interconnected by a bight portion 90 which extends transversely therebetween to define a second lower handle. As before, a handle grip 92 is mounted in the central portion of the bight portion 90. The tubular component as shown is preferably formed from two separate tubes, the end sections of which are welded in end to end engagement to form the bight portions 66 and 90, the welded joints being covered by the handle grips 68 and 92.

The construction of the frame structure 12 enables the assembly 10 to be manually moved in several different modes. The provision of the skid plate 54 with the runner-like embossments 56 in conjunction with the upper handle grip 68 enables the assembly 10 to be manually moved by the user manually engaging the upper handle grip 68 and moving the handle 66 in a direction toward the upright portion of the frame structure 12. This movement has the effect of transferring the support of the assembly 10 from the lower surfaces of the legs 62 to the lower surfaces of the runner-like embossments 56. The assembly 10 can then be manually moved with a ground engaging skidding action by simply continuing the movement imparted to the upper handle grip 68 once the support transfer to the surfaces of the runner-like embossments 56 has been accomplished.

The provision of separate upper and lower handle grips 68 and 92 renders the assembly 10 capable of two lifting modes. One mode of lifting the assembly 10 is by a single person grasping each handle grip 68 and 92 with a different hand. A second mode is by two persons each grasping a different handle grip 68 or 92 by one hand. Of course, once lifted, the assembly 10 can be carried in either of the modes described It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. A portable power operated air compressor assembly comprising:

a portable frame structure;

a power operated air compressor unit carried by said frame structure having structure constructed and arranged to provide a source of air under pressure when power operated, and containing structure carried by said frame structure constructed and arranged to receive and contain the source of air under pressure provided by said power operated air compressor unit for use when desired;

said portable frame structure including a base portion providing ground engaging surfaces configured and positioned to engage and support said base portion in generally horizontally extending relation on a horizontal surface, an upright portion having a juncture with said base portion and extending upwardly therefrom when said base portion is supported as aforesaid;

a handle positioned above said base portion when said base portion is supported as aforesaid and configured to be manually grasped;

a skid plate forming a part of said base portion and said upright portion at the juncture therebetween and extending substantially across a width of said portable frame structure, said skid plate providing runner-like surfaces at the juncture between said base portion and said upright portion configured and positioned to slidingly support the frame structure along a horizontal surface in response to a manual movement imparted thereto by a user grasping said handle and moving the portable frame structure so as to transfer the horizontal surface engagement from said ground engaging surfaces to said runner-like surfaces.

2. A portable power operated air compressor assembly as defined in claim 1 wherein said containing structure includes a cylindrical tank disposed in spaced relation alongside said skid plate, said tank having a manually operable moisture drain valve communicating with a lower portion thereof, said skid plate being disposed in spaced protecting relation to said drain valve and having an opening providing manual access thereto.

3. A portable power operated air compressor assembly as defined in claim 2 wherein said containing structure includes a second cylindrical tank disposed in spaced relation alongside said skid plate parallel to said first mentioned tank, said second tank having a second manually operable moisture drain valve communicating with a lower portion thereof, said skid plate being disposed in spaced protecting relation to said second drain valve and having a recess providing manual access thereto.

4. A portable power operated air compressor assembly as defined in claim 3 wherein said portable frame structure further includes a lower handle positioned in horizontally outwardly spaced relation with respect to said power operated air compressor unit and configured to be manually grasped by a user, and said first mentioned handle and said lower handle being constructed and arranged to enable said frame structure to be lifted by a single person gripping each handle with a different hand or by two persons each gripping a different handle with one hand.

5. A portable power operated air compressor assembly comprising:

a portable frame structure;

a power operated air compressor unit carried by said frame structure having structure constructed and arranged to provide a source of air under pressure when power operated, and containing structure carried by said frame structure constructed and arranged to receive and contain the source of air under pressure provided by said power operated air compressor unit for use when desired;

said portable frame structure including a base portion providing ground engaging surfaces configured and positioned to engage and support said base portion in generally horizontally extending relation on a horizontal surface, an upright portion having a juncture with said base portion and extending upwardly therefrom when said base portion is supported as aforesaid;

a handle positioned above said base portion when said base portion is supported as aforesaid and configured to be manually grasped;

a skid plate forming a part of said base portion and said upright portion at the juncture therebetween, said skid plate providing runner-like surfaces at the juncture between said base portion and said upright portion configured and positioned to slidingly support the frame structure along a horizontal surface in response to a manual movement imparted thereto by a user grasping said handle and moving the portable frame structure so as to transfer the horizontal surface engagement from said ground engaging surfaces to said runner-like surfaces; wherein said containing structure includes a cylindrical tank disposed in spaced relation alongside said skid plate, said tank having a manually operable moisture drain valve communicating with a lower portion thereof, said skid plate being disposed in spaced protecting relation to said drain valve and having an opening providing manual access thereto;

said containing structure includes a second cylindrical tank disposed in spaced relation alongside said skid plate parallel to said first mentioned tank, said second tank having a second manually operable moisture drain valve communicating with a lower portion thereof, said skid plate being disposed in spaced protecting relation to said second drain valve and having a recess providing manual access thereto;

said portable frame structure further includes a lower handle positioned in horizontally outwardly spaced relation with respect to said power operated air compressor unit and configured to be manually grasped by a user, and said first mentioned handle and said lower handle being constructed and arranged to enable said frame structure to be lifted by a single person gripping each handle with a different hand or by two persons each gripping a different handle with one hand; and said portable frame structure includes an inclined portion extending upwardly and inwardly from said upright portion providing said handle, said inclined portion including an inclined protective plate having a series of openings therein positioned in convenient user access, a containing structure air pressure gauge having structure constructed and arranged to display the pressure in the air under pressure within said containing structure cooperatively mounted within respect to a first opening of said series of openings, an air under pressure outlet communicating with said containing structure cooperatively mounted with respect to a second opening of said series of openings, a manually operable valve cooperatively mounted with respect to a third opening of said series of openings, said manually operable valve being constructed and arranged to vary the air pressure provided by said containing structure which is communicated to said outlet for use when desired, an output air pressure gauge having structure constructed and arranged to display the pressure of the air under pressure cooperatively mounted with respect to a fourth opening of said series of openings, and a manually actuated control member cooperatively mounted with respect to a fifth opening of said series of openings, said control member having a structure constructed and arranged to control the operation of said power operated compressor unit.

6. A portable power operated air compressor assembly as defined in claim 5 wherein said protective plate has gauge protective structure fixedly carried thereby configured and positioned to provide spaced peripheral damage protection for each of said gauges.

7. A portable power operated air compressor as defined in claim 1 wherein said base portion includes a pair of transversely spaced tubular base frame members, said upright portion includes a pair of transversely spaced tubular upright frame members forming upright integral extensions of said pair of tubular base frame member at one pair of ends thereof, said frame structure further including an upper U-shaped tubular frame member having leg portions forming upwardly and inwardly extending integral extensions of upper ends of said upright frame members and a bight portion providing said handle, said portable frame structure also including a lower U-shaped tubular frame member having leg portions forming upwardly and outwardly extending integral extensions of an opposite pair of ends of said pair of tubular base frame members and a bight portion providing a second handle.

8. A portable power operated air compressor assembly comprising:

a portable frame structure;

a power operated air compressor unit carried by said frame structure having structure constructed and arranged to provide a source of air under pressure when power operated, and containing structure carried by said frame structure constructed and arranged to receive and contain the source of air under pressure provided by said power operated air compressor unit for use when desired;

said portable frame structure including a base portion providing ground engaging surfaces configured and positioned to engage and support said base portion in generally horizontally extending relation on a horizontal surface, an upright portion having a juncture with said base portion and extending upwardly therefrom when said base portion is supported as aforesaid;

a handle positioned above said base portion when said base portion is supported as aforesaid and configured to be manually grasped;

a skid plate forming a part of said base portion and said upright portion at the juncture therebetween, said skid plate providing runner-like surfaces at the juncture between said base portion and said upright portion configured and positioned to slidingly support the frame structure along a horizontal surface in response to a manual movement imparted thereto by a user grasping said handle and moving the portable frame structure so as to transfer the horizontal surface engagement from said ground engaging surfaces to said runner-like surfaces; wherein said portable frame structure includes an inclined portion extending upwardly and inwardly from said upright portion providing said handle, said inclined portion including an inclined protective plate having a series of openings therein positioned in convenient user access, a containing structure air pressure gauge having structure constructed and arranged to display the pressure in the air under pressure within said containing structure cooperatively mounted within respect to a first opening of said series of openings, an air under pressure outlet communicating with said containing structure cooperatively mounted with respect to a second opening of said series of openings, a manually operable valve cooperatively mounted with respect to a third opening of said series of openings, said manually operable valve being constructed and arranged to vary the air pressure provided by said containing structure which is communicated to said outlet for use when desired, an output air pressure gauge having structure constructed and arranged to display the pressure of the air under pressure cooperatively mounted with respect to a fourth opening of said series of openings, and a manually actuated control member cooperatively mounted with respect to a fifth opening of said series of openings, said control member having a structure constructed and arranged to control the operation of said power operated compressor unit.

9. A portable power operated air compressor assembly as defined in claim 8 wherein said protective plate has gauge protective structure fixedly carried thereby configured and positioned to provide spaced peripheral damage protection for each of said gauges.

10. A portable power operated air compressor assembly comprising:

a portable frame structure;

a power operated air compressor unit carried by said frame structure having structure constructed and arranged to provide a source of air under pressure when power operated, and containing structure carried by said frame structure constructed and arranged to receive and contain the source of air under pressure provided by said power operated air compressor unit for use when desired;

said portable frame structure including a base portion providing ground engaging surfaces configured and positioned to engage and support said base portion in generally horizontally extending relation on a horizontal surface;

an upright portion having a juncture with said base portion and extending upwardly therefrom when said base portion is supported as aforesaid;

a handle positioned above said base portion when said base portion is supported as aforesaid and configured to be manually grasped;

a protective plate forming a part of said base portion and said upright portion at the juncture therebetween;

said containing structure including a cylindrical tank disposed in spaced relation alongside said plate;

said tank having a manually operable moisture drain valve communicating with a lower portion thereof;

said protective plate being disposed in spaced protecting relation to said drain valve and having an opening providing manual access thereto.

11. A portable power operated air compressor assembly comprising:

a portable frame structure;

a power operated air compressor unit carried by said frame structure having structure constructed and arranged to provide a source of air under pressure when power operated; and containing structure carried by said frame structure constructed and arranged to receive and contain the source of air under pressure provided by said power operated air compressor unit for use when desired;

said portable frame structure providing a lower handle positioned in horizontally outwardly spaced relation with respect to said power operated air compressor unit and configured to be manually grasped by a user; and an upper handle positioned in vertically upwardly spaced relation with respect to said power operated air compressor unit configured to be manually grasped by a user;

said lower and upper handle being constructed and arranged to enable said frame structure to be lifted by a single person gripping each handle with a different hand or by two persons each gripping a different handle with one hand.

12. A portable power operated air compressor as defined in claim 11 wherein said frame structure includes a pair of transversely spaced tubular base frame members, a pair of transversely spaced tubular upright frame members forming upright integral extensions of said pair of tubular base frame member at one pair of ends thereof, an upper U-shaped tubular frame member having leg portions forming upwardly and inwardly extending integral extensions of upper ends of said upright frame members and a bight portion providing said upper handle member, a lower U-shaped tubular frame member having leg portions forming upwardly and outwardly extending integral extensions of an opposite pair of ends of said pair of tubular base frame members and a bight portion providing a second handle member.

13. A portable power operated air compressor assembly comprising:

a portable frame structure;

a power operated air compressor unit carried by said frame structure having structure constructed and arranged to provide a source of air under pressure when power operated; and containing structure carried by said frame structure constructed and arranged to receive and contain the source of air under pressure provided by said power operated air compressor unit for use when desired;

said portable frame structure including;

a base portion providing ground engaging surfaces configured and positioned to engage and support said base portion in generally horizontally extending relation on a horizontal surface;

an upright portion having a juncture with said base portion and extending upwardly therefrom when said base portion is supported as aforesaid;

and an inclined portion extending upwardly and inwardly from said upright portion providing a handle positioned above said power operated air compressor unit and configured to be manually grasped;

said inclined portion including an inclined protective plate having a series of openings therein positioned in convenient user access;

a containing structure air pressure gauge having structure constructed and arranged to display the pressure of the air under pressure within said containing structure cooperatively mounted with respect to a first opening of said series of openings;

an air under pressure outlet communicating with said containing structure cooperatively mounted with respect to a second opening of said series of openings;

a manually operable valve cooperatively mounted with respect to a third opening of said series of openings, said manually operable valve being constructed and arranged to vary the air pressure provided by said containing structure which is communicated to said outlet for use when desired;

an outlet air pressure gauge having structure constructed and arranged to display the pressure of the air under pressure at said outlet cooperatively mounted with respect to a fourth opening of said series of openings; and a manually actuated control member cooperatively mounted with respect to a fifth opening of said series of openings;

said control member having structure constructed and arranged to control the operation of said power operated compressor unit.

14. A portable power operated air compressor assembly as defined in claim 13 wherein said protective plate has gauge protective structure fixedly carried thereby configured and positioned to provide spaced peripheral damage protection for each of said gauges.

15. A portable power operated air compressor as defined in claim 13 wherein said base portion includes a pair of transversely spaced tubular base frame members, said upright portion includes a pair of transversely spaced tubular upright frame members forming upright integral extensions of said pair of tubular base frame member at one pair of ends thereof, said inclined portion includes an upper U-shaped tubular frame member having leg portions forming upwardly and inwardly extending integral extensions of upper ends of said upright frame members and a bight portion providing said handle, said portable frame structure also including a lower U-shaped tubular frame member having leg portions forming upwardly and outwardly extending integral extensions of an opposite pair of ends of said pair of tubular base frame members and a bight portion providing a second handle.

16. A portable power operated air compressor assembly comprising:

a portable frame structure;

a power operated air compressor unit carried by said frame structure having structure constructed and arranged to provide a source of air under pressure when power operated; and containing structure carried by said frame structure constructed and arranged to receive and contain the source of air under pressure provided by said power operated air compressor unit for use when desired;

said portable frame structure including;

a base portion providing ground engaging surfaces configured and positioned to engage and support said base portion in generally horizontally extending relation on a horizontal surface;

an upright portion having a juncture with said base portion and extending upwardly therefrom when said base portion is supported as aforesaid; and an inclined portion extending upwardly and inwardly from said upright portion providing a handle positioned above said power operated air compressor unit and configured to be manually grasped;

said inclined portion including an inclined protective plate having a series of openings therein positioned in convenient user access;

air pressure gauge having structure carried by said protective plate in a position to be received by a user looking down thereon; and gauge protective structure fixedly carried by said protective plate configured and positioned to provide spaced peripheral damage protection for said gauge structure.

17. A portable power operated air compressor as defined in claim 16 wherein said base portion includes a pair of transversely spaced tubular base frame members, said upright portion includes a pair of transversely spaced tubular upright frame members forming upright integral extensions of said pair of tubular base frame member at one pair of ends thereof, said inclined portion includes an upper U-shaped tubular frame member having leg portions forming upwardly and inwardly extending integral extensions of upper ends of said upright frame members and a bight portion providing said handle, said portable frame structure also including a lower U-shaped tubular frame member having leg portions forming upwardly and outwardly extending integral extensions of an opposite pair of ends of said pair of tubular base frame members and a bight portion providing a second handle.

* * * * *